OR 3,154,761

SEARCH ROOM

Oct. 27, 1964 W. F. O'GORMAN 3,154,761

SECURITY SYSTEM

Filed March 20, 1961 5 Sheets-Sheet 1

INVENTOR.
WILLIAM F. O'GORMAN

BY James and Franklin

ATTORNEYS

INVENTOR.
WILLIAM F. O'GORMAN
BY James and Franklin
ATTORNEYS

Oct. 27, 1964 W. F. O'GORMAN 3,154,761

SECURITY SYSTEM

Filed March 20, 1961 5 Sheets-Sheet 3

INVENTOR.
WILLIAM F. O'GORMAN

BY James and Franklin

ATTORNEYS

INVENTOR.
WILLIAM F. O'GORMAN
BY James and Franklin
ATTORNEYS

Oct. 27, 1964 W. F. O'GORMAN 3,154,761

SECURITY SYSTEM

Filed March 20, 1961 5 Sheets-Sheet 5

INVENTOR.
WILLIAM F. O'GORMAN

BY James and Franklin

ATTORNEYS

United States Patent Office 3,154,761

Patented Oct. 27, 1964

3,154,761

SECURITY SYSTEM

William F. O'Gorman, New York, N.Y., assignor, by mesne assignments, to Daniel N. Garrett, Scarborough-on-the-Hudson, N.Y.

Filed Mar. 20, 1961, Ser. No. 97,030

20 Claims. (Cl. 340—149)

This invention relates to security systems, and more particularly to a pass card system for controlling entrance to a manufacturing plant or laboratory or other enclosure to be protected.

The primary object of the present invention is to generally improve security systems or pass card systems for the specified purpose. A more specific object is to provide a pass card (often more briefly called a "pass" or a "card") having concealed therein small strips of magnetic material adapted to be impressed magnetically with a normally-retained but reversible polarity code or pattern. The entrance to the plant is provided with a "detector" to which the pass is presented in order to check whether it has the proper polarity code, and in accordance with further features and objects of the invention, appropriate alarm means or/and a barrier such as a gate or turnstile, may be provided, all under control of the detector.

A further object of the invention is to make the polarity code readily changeable, and to change it from time to time. The plant gate is provided with a "validator" to which the pass is presented when leaving the plant, and this impresses the pass with a polarity code needed for entrance to the plant the next day. To facilitate changing the validator and detector from time to time, perhaps daily, I provide each with a locked array of switches.

A plant having multiple gates may be provided with a validator and a detector at each gate, and all may be adjusted alike under control of similar arrays of switches. However, if different personnel are to be restricted to different gates, the detector and validator at one gate may be adjusted differently from that at another.

A further object of the invention is to change the polarity code of the pass in order to make it incorrect each time it has been presented to the detector. Thus the pass is devalidated or voided for the rest of the day, and until again newly validated for the next day on leaving the plant.

A more specific object is to improve the system disclosed in my copending application Serial No. 524,320 filed July 26, 1955, since on December 26, 1961 as Patent No. 3,015,087, by making the same much simpler, more rugged in structure, and foolproof in operation.

To accomplish the foregoing general objects, and other more specific objects which will hereinafter appear, my invention resides in the validator and detector elements, and their relation one to another, as are hereinafter more particularly described in the following specification. The specification is accompanied by drawings in which.

Figures 1, 2, 3, 4, 5, 6:
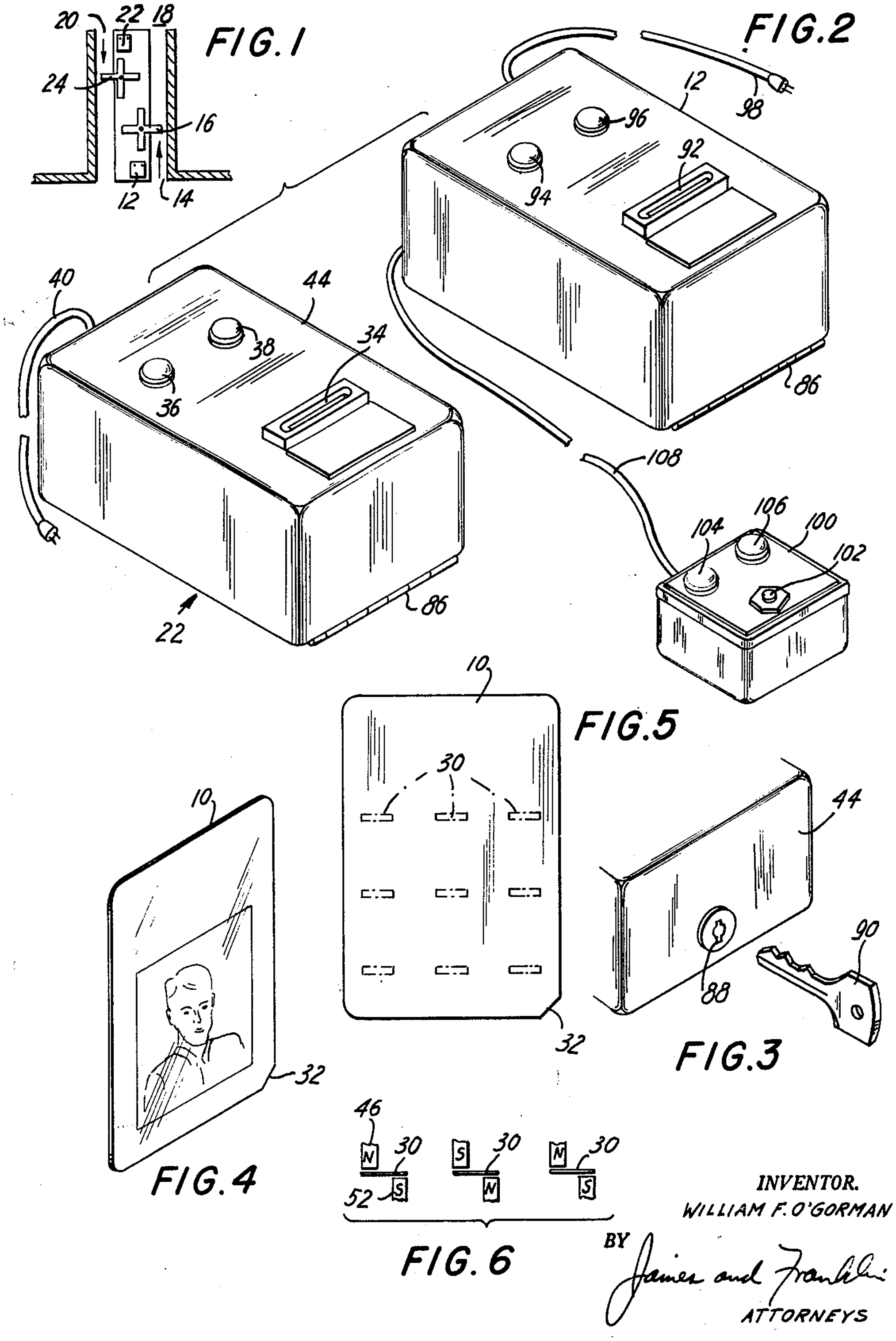
FIG. 1 is a plan view drawn to small scale, and schematically showing one location of the main units of the invention.
FIG. 2 is a perspective view showing one form of the validator and detector forming parts of the invention.
FIG. 3 is a fragmentary perspective view showing the opposite end of either unit.
FIG. 4 is a perspective view showing one of the pass cards.
FIG. 5 shows a pass card with nine concealed strips of magnetic material.
FIG. 6 is a schematic view explanatory of the method of magnetization of the pass card.

Referring to the drawing, and more particularly to FIG. 1, a detector 12 is disposed adjacent an entrance path 14 which is blocked by a turnstile 16, and which leads into a plant of laboratory or other restricted premises, generally designated 18. A person seeking entry must present his pass to the detector 12, which releases the turnstile 16 in the event that the pass is proper. If not there is a suitable alarm, visual or audible or both. As the pass is removed it is altered and thereby voided. Upon leaving the plant through an exit path 20, the employe presents the pass to a validator 22, which similarly has a slot to receive the pass.

While in the validator, the pass is impressed with a polarity code which may differ from that which was on the pass during the preceding entry. The new code is one which will be required to satisfy the detector when a person enters the plant the next day. The validator may be provided with means to help insure that the pass has been properly inserted to receive the new polarity code, failing which a red lamp or audible alarm or both may be energized. Moreover, an exit turnstile 24 may be provided, and this is not released, thereby additionally warning the employe that the pass has not been properly validated for his next admission. Moreover, an attendant or guard also is put on notice.

A typical pass card is shown in FIG. 4. It is conventional in appearance, and comprises a printed sheet laminated between and protected by plastic sheets. The printed sheet may include a picture of the employee and his name on one side, and the opposite side may have any of the usual data, such as age, height, weight, color of hair, color of eyes, thumb print, date of issuance of the pass card, Social Security number, hand written signature of the employee, etc. In such matters the pass may be the same as that normally used in the particular plant being protected.

However, concealed within the paper portion of the pass there are a plurality of strips of magnetic material. These are so thin and film-like that they do not alter the appearance of the pass. As shown in FIG. 5, the particular pass here illustrated has nine strips 30 of ferrous material, disposed in three rows. These strips are invisible, but they may be magnetized from the outside, and the polarity of one may differ from that of another. This results in a large number of different combinations of polarity, specifically, two to the ninth power, or 512 different combinations.

It will be noted that one corner of the card is cut away as shown at 32, to insure insertion of the card in proper position. In the present case, the corner 32 is disposed at the bottom-right, and the picture face of the card then is upright and faces the person inserting it in the slot, so that the operation is entirely natural.

A typical validator is shown at 22 in FIG. 2. There is a slot 34 into which the pass is inserted. The indicator lenses 36 and 38 may flash either red or green. If the pass is improperly or incompletely inserted, the red lens is lighted, but if properly inserted, the green lamp is lighted. The device is energized from an ordinary 110 volt A.C. power line, as indicated by the cord and standard plug 40.

Figures 7, 8:
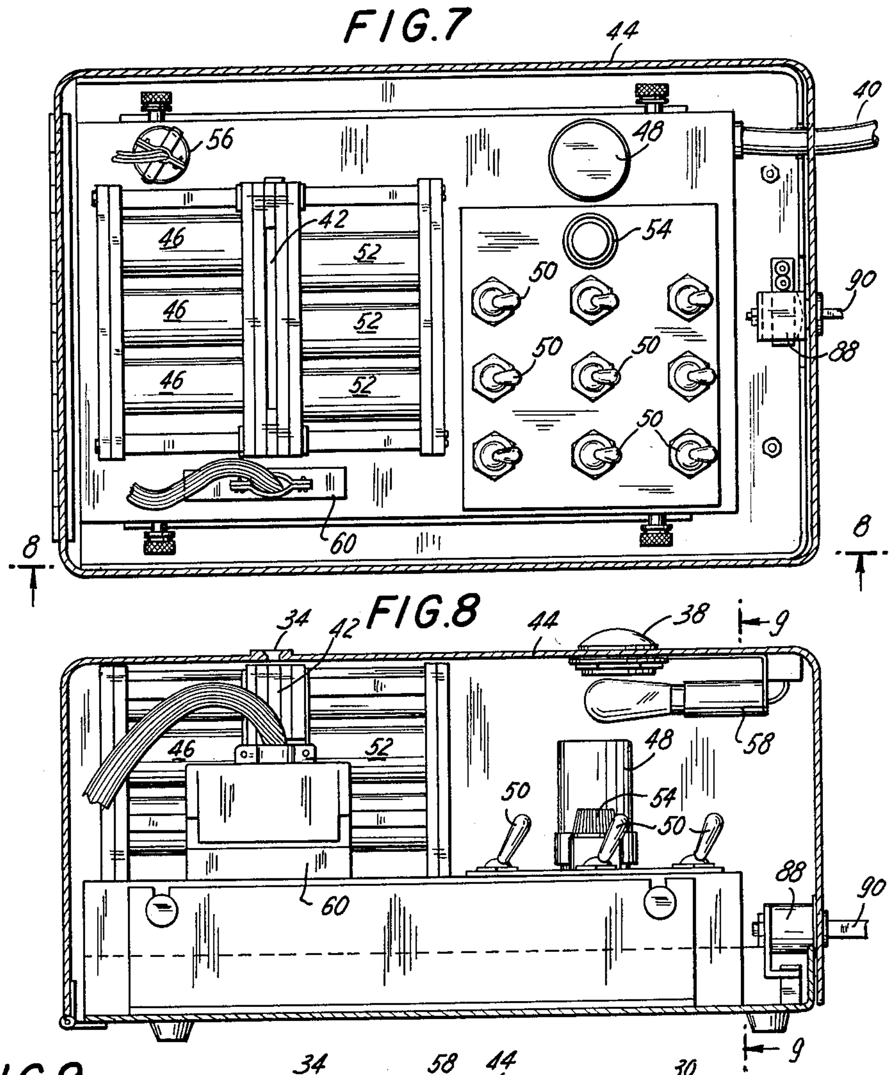
FIG. 7 is a horizontal section taken below the lamps and showing the inside of the validator of FIG. 2.
FIG. 8 is a vertical section taken approximately in the plane of the line 8—8 of FIG. 7.
Figure 9:
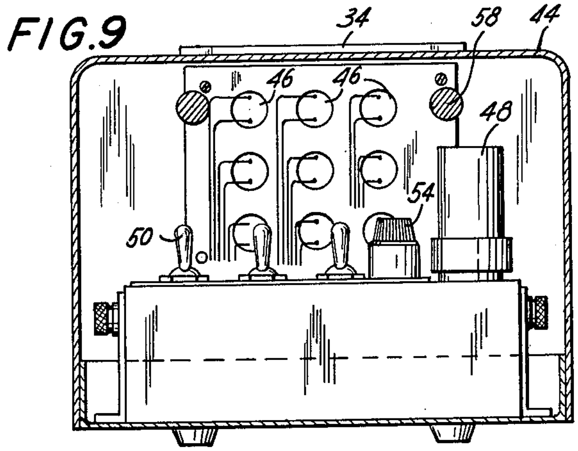
FIG. 9 is a vertical section taken approximately in the plane of the line 9—9 of FIG. 8.

Referring now to FIGS. 7, 8 and 9, the pass is inserted in a slot 42 which is located directly beneath the slot 34 in the cover 44. The validator has an array of electromagnets 46, each with a pole located adjacent one end of a corresponding magnetizable strip in the pass. There is also a source of D.C. current, in this case a rectifier located at 48, and there is a switching means, in this case an array of double throw switches 50, one for each electromagnet, whereby the current flow in any electromagnet may be reversed independently of the others, in order to control the polarity thereof. In the specific form here illustrated, there are two arrays of electromagnets, the first array 46 being located on one side of the pass with the poles adjacent one end of the ferrous strips in the pass, and the second array 52 being located on the other side of the pass adjacent the other end of the strips in the pass. Each magnet 46 has a paired magnet 52, and the paired magnets are connected to one another for simultaneous energization in opposite polarity, the polarity of the pair being controlled by its related reversing switch 50.

FIG. 6 is a schematic fragmentary view somewhat resembling a horizontal section through a line of strips and magnets. The strip 30 is exposed to a magnetic pole 46 adjacent one end on one side, and a magnetic pole 52 adjacent the other end on the other side, one of these poles being polarized north, and the other south, thereby strongly polarizing the strip 30. Poles 46 and 52 could be on one side of the pass, but the arrangement on opposite sides here shown affords much more room for the coils of the electromagnets, which then may be much larger in diameter than would be permitted by the strips 30 if they were on the same side of the strip. In FIG. 6 the middle strip is shown polarized oppositely to the end strips, and this polarization may vary and depends on the relative disposition of the different switches in the switch array shown in FIG. 7.

Reverting to FIGS. 7, 8, and 9, the rectifier 48 is energized from an ordinary A.C. wall outlet through a flexible cord 40. A replaceable fuse is housed at 54. A detachable connector 56 has flexible wires which extend upward to the top of the hinged cover in order to energize one or another of a pair of lamps 58, disposed beneath red and green lenses previously referred to at 36 and 38 in FIG. 2. The part 60 is a multi-prong detachable connector for the numerous conductors leading from the switches 50 to the electromagnets 46, 52. Its use is optional.

Figures 16, 17, 18:
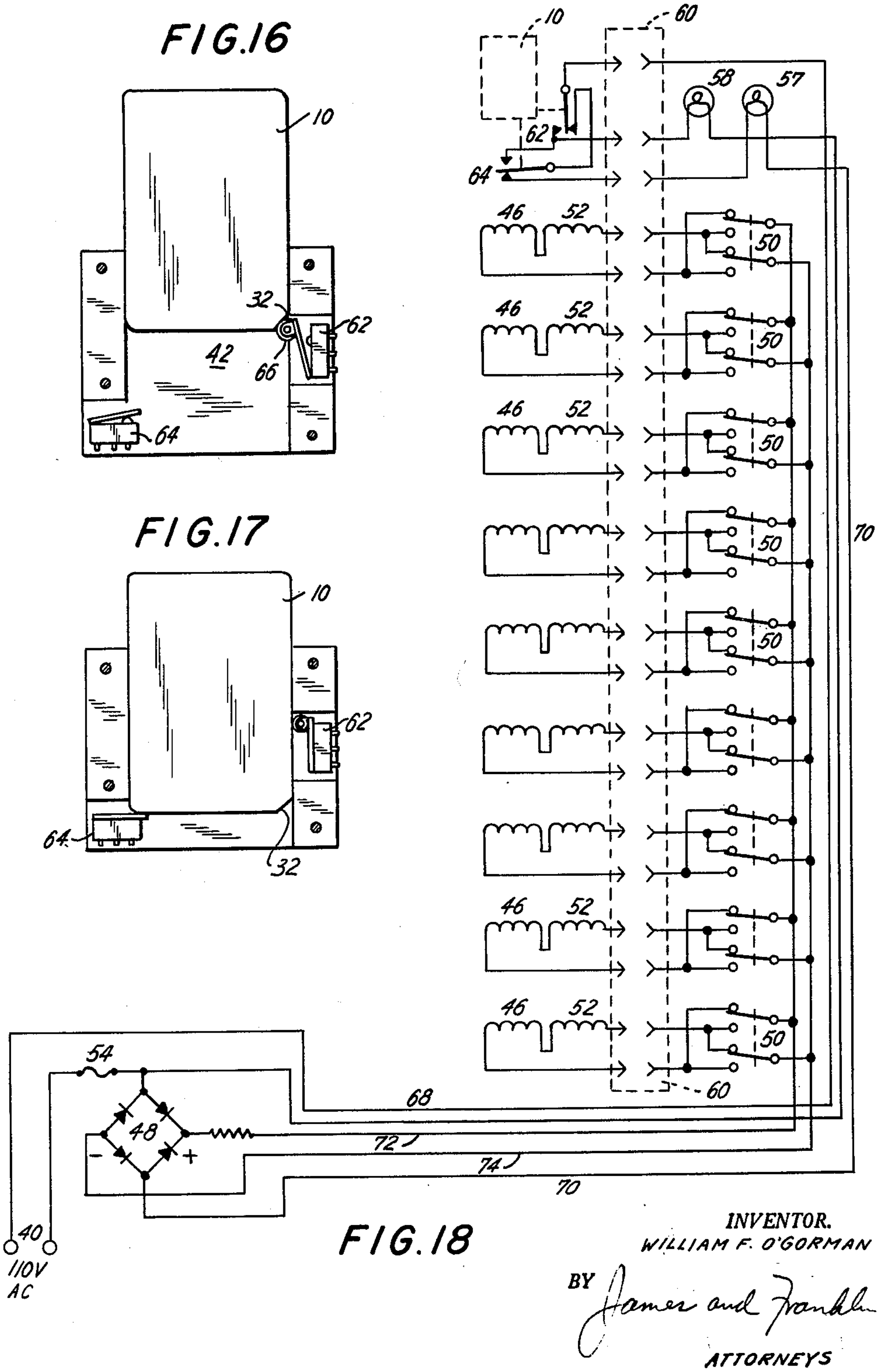
FIG. 16 illustrates the partial insertion of a pass card.
FIG. 17 shows the complete insertion of the pass card.
FIG. 18 is a wiring diagram for the validator.

A wiring diagram for the validator is given in FIG. 18. The coils of the electromagnets are shown at 46 and 52, there being nine such pairs of electromagnets. The reversing switches are double-pole double-throw switches indicated at 50, there being one switch for each electromagnet pair. The detachable connector between the switches and the electromagnets is represented by the dotted rectangle at 60.

The A.C. input is shown at 40, and is fused at 54. The rectifier is a selenium bridge full wave rectifier shown at 48, and in the particular case here shown, it is a silicon rectifier, No. 40 B 100 made by Control Circuits, Inc. of Middletown, Connecticut. The lamps 57 and 58 are energized in this case from the A.C. line rather than the rectifier, and are connected to precision switches 62 and 64 through three of the pins of the detachable connector 60. The side switch 62 is responsive to partial insertion of the pass 10, and the bottom switch 64 is responsive to full insertion of the pass.

This is further illustrated in FIGS. 16 and 17 of the drawing, which show how switch 62 is operated by a cam roller 66 located at the side of slot 42. Switch 64 is located at the bottom and is operated when the pass has been fully inserted, as shown in FIG. 17. The arm 66 is pushed aside by the bevelled corner 32, and if the pass is improperly inserted, it cannot be pressed downward because the arm 66 then does not yield. Moreover, if the bevel is on the left the switch 64 is not actuated.

Reverting now to FIG. 18, the non-insertion or improper insertion of a pass will leave switch 64 open, thereby leaving the red lamp 58 lit. When the pass is partially inserted the switch 62 is closed to the right contact, but that contact is in series with switch 64 which is still open. In such case the red lamp remains lit, and the green lamp is not lighted. When the pass is fully inserted the switches 62 and 64 are both closed, and the green lamp 57 is lighted instead of the red lamp. At the same time power is supplied to the rectifier 48 through A.C. conductor 68, switch 62, switch 64, conductor 70, to the bridge 48, and thence through fuse 54 and back to the line. The rectifier then being energized, it supplies D.C. current to the switches 50 and the electromagnets 46, 52, this being done through conductor 72, leading to one pole of the switches 50, and back through conductor 74, connected to the other pole of the switches, the said conductors being connected across the bridge as shown.

The electromagnets normally are deenergized, and they are again deenergized the moment the pass begins to rise from the validator, because of the immediate opening of the bottom switch 64. There is accordingly no danger of spoiling the desired polarity pattern as the pass rises past the electromagnets. They are energized only when the pass is fully inserted, at which time each pair of electromagnets is in registration with its particular magnetic strip in the pass.

In FIG. 18 the upper contact of the bottom switch 64 could take care of the red lamp, in which case the side switch 62 could be eliminated. However, the side switch is helpful to determine the proper width of pass, by eliminating a pass which is too narrow. Moreover the roller arrangement on the side magnet may be so designed as to actually physically stop a pass which is inserted without the bevel being at that side. This has the advantage of immediately notifying the workman of improper insertion.

Figure 10:
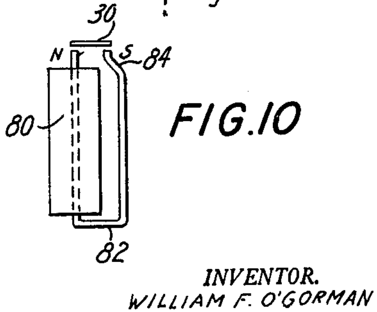
FIG. 10 is a fragmentary view explanatory of a modification.

It is not essential but I consider it highly preferable to have two different electromagnets for the two ends of each ferrous strip. FIG. 10 shows how a single electromagnet coil 80 might be used with a core which is bent into U shape, as shown at 82, but with the poles brought somewhat closer together, as shown at 84, to register with one of the ferrous strips 30 in the pass card. It will be understood that there would be an array of electromagnets like that shown in FIG. 10, dimensioned compactly enough so that adjacent electromagnets may register with adjacent magnetic strips 30 in the pass card, with all magnets on one side of the card. With larger magnets, alternate ones could be on one side, and intermediate ones on the opposite side.

However, as above stated, I have obtained stronger and more rapid validation of the card by using separate electromagnets or magnetic poles on opposite sides of the card for each magnetic strip. I do not wish this discovery to be limited by or to be dependent on theory, but I believe the difference arises from the fact that there is considerable clearance between the embedded magnetic strip in the card, and the ends of the magnet poles. When both poles are on one side, as in FIG. 10 for example, much of the magnetic flux may flow directly between the poles of the magnet without necessarily being forced through the magnetic strip. However, when the pole at one end of the strip is on one side of the card, and the pole at the other end of the strip is on the other side of the card, the flux flowing from one pole to the other tends naturally to concentrate in and to flow through the embedded strip. The flux flowing from one pole to the other crosses through the strip regardless of any gaps between the poles and the strip.

Reverting to FIGS. 2 and 3 of the drawing, the cover 44 of the validator is connected to the base by means of a piano hinge 86 at one end. A lock is provided at the opposite end, as shown at 88 in FIG. 3. This lock is preferably of good quality, and receives an appropriate key shown at 90. Thus, the cover is readily openable by an authorized security officer for access to the switch array 50 shown in FIG. 7, making it easy to change the polarity code. However, the code cannot be seen or changed by others.

The detector may be described with preliminary reference to FIG. 2. As here shown it resembles the validator in appearance, there being a slot 92 for insertion of a pass, and green and red lenses 94 and 96 to differentiate between a correct and an incorrect pass. The detector 12 is energized through a flexible cord 98, leading to a male plug for insertion in an ordinary 110 volt A.C. wall outlet. FIG. 2 also shows a remote indicator 100 with a re-set button 102, and red and green lenses 104 and 106. This is connected by flexible conductors 108 of suitable length, so that the indicator 100 may be located in a security office, remote from the detector. In each case an audible alarm may be provided in shunt with the red lamp. Such extensions and auxiliaries also may be used when one guard is in charge of a group of adjacent passages which are used because a large volume of personnel must pass in a short time.

Figure 11:
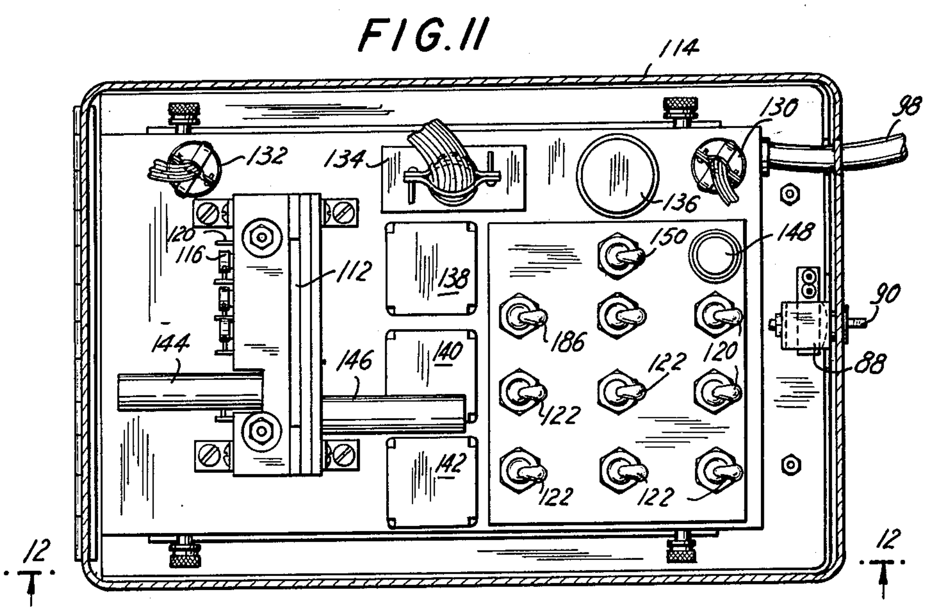
FIG. 11 is a horizontal section taken below the lamps and showing the inside of the detector of FIG. 2.
Figures 12, 13, 14, 15:
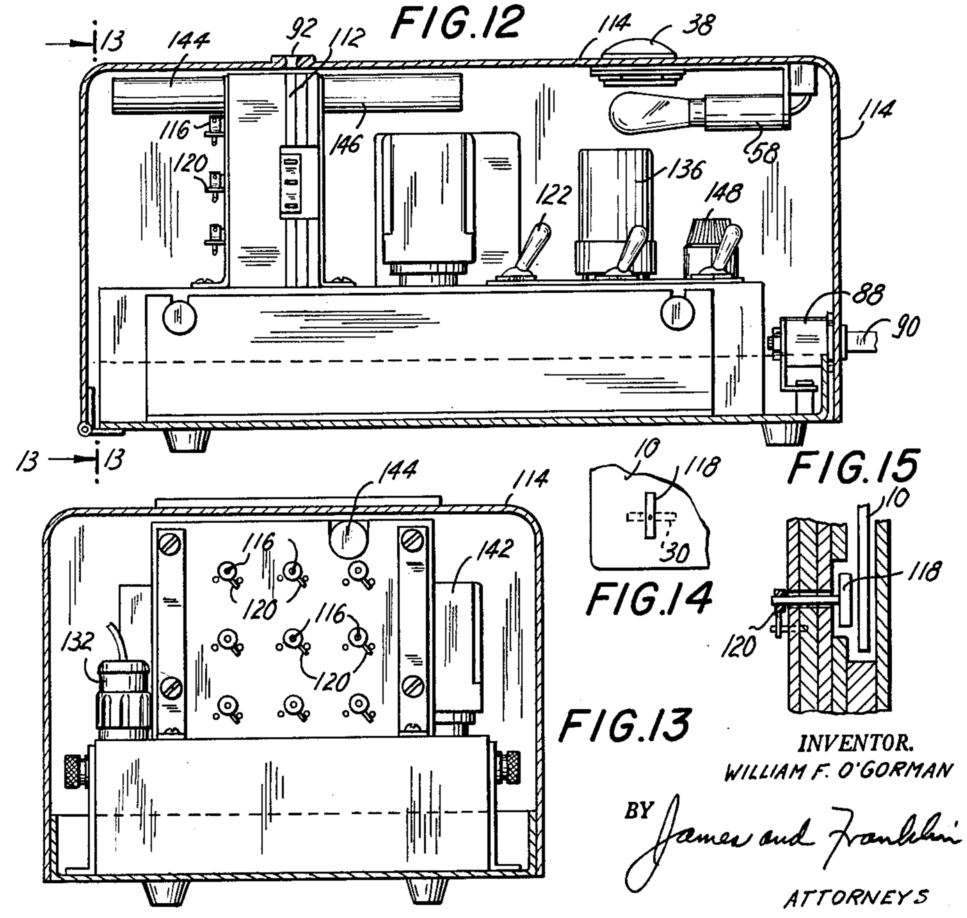
FIG. 12 is a vertical section taken in the plane of the line 12—12 of FIG. 11.
FIG. 13 is a section taken approximately in the plane of the line 13—13 of FIG. 12.
FIGS. 14 and 15 are fragmentary schematic views explanatory of a detail of the detector.

The interior of the detector is shown in FIGS. 11, 12 and 13 of the drawing. In FIG. 11 the slot 112 is located directly beneath the slot 92 in the cover 114. The detector includes an array of pivoted magnets, each located adjacent its corresponding ferrous strip in the pass card. The pivots of these magnets are shown at 116 in FIG. 13.

Referring now to FIGS. 14 and 15, each pivoted magnet 118 is disposed transversely of the ferrous strip 30 in the pass card 10. In consequence the magnet tends to turn to one side of the other, depending upon the polarity of the strip 30. Referring now to FIG. 13, each pivot 116 carries a movable contact 120 which may be turned through a total arc of about 90° to engage one or the other of the two stationary pins or contacts on opposite sides of the movable contact.

FIG. 11 shows an array of double-throw switches 122, one for each pivoted magnet, whereby the polarity pattern which satisfies the detector may be adjusted as desired. This is illustrated in the wiring diagram of FIG. 19. The movable contacts 120 are tilted one way or the other by the pivoted magnets. The stationary contacts are connected through a multiple contact connector 124 to the manually operable double-throw switches 122. Upon examination, it will be seen that the movable contacts 120 and the switches 122 are connected in series, and that these series combinations are connected back and forth in series with one another. If every movable contact 120 is turned in the same direction as its corresponding switch 122, the circuit between the top conductor 126 and the bottom conductor 128 is established, but if even a single movable contact is wrongly tilted, the zig-zag series circuit is opened.

Reverting to FIGS. 11, 12 and 13, the part 130 is a detachable connector for the conductors leading to the remote indicator previously mentioned. The part 132 is a detachable connector leading to the lamps on the cover 114. The part 134 is a many-pronged detachable connector between the switch array 122 and the contacts of the pivoted magnets. A full-wave rectifier is shown at 136. This is plugged into a socket, and is the same type as rectifier 48 in FIG. 7.

Relays are plugged into position at 138, 140 and 142. The relays 138 and 140 here used are type KCP 11, and the relay 142 is type KCP 14, both made by Potter and Brumfield of Princeton, Indiana. A pair of relatively offset electromagnets are shown at 144 and 146. These are described later, but their purpose briefly is to change the polarity code of a pass after it has been scrutinized in the detector. A fuse is housed at 148, and a double-pole double-throw switch is shown at 150, this being for the purpose of reversing the polarity of the electromagnets 144 and 146. The pivoted magnets are permanently polarized, and those here shown are made of Alnico #5. They are ⅜" long and ⅛" in thickness.

The slot which receives the pass card is preferably provided with precision switches, as previously described, and FIGS. 16 and 17 therefore are applicable to the detector as well as to the validator. Here again there is a side switch 62 and a bottom switch 64, and the side switch 62 cooperates with the bevelled corner of the pass to insure proper orientation of the pass.

Figure 19:
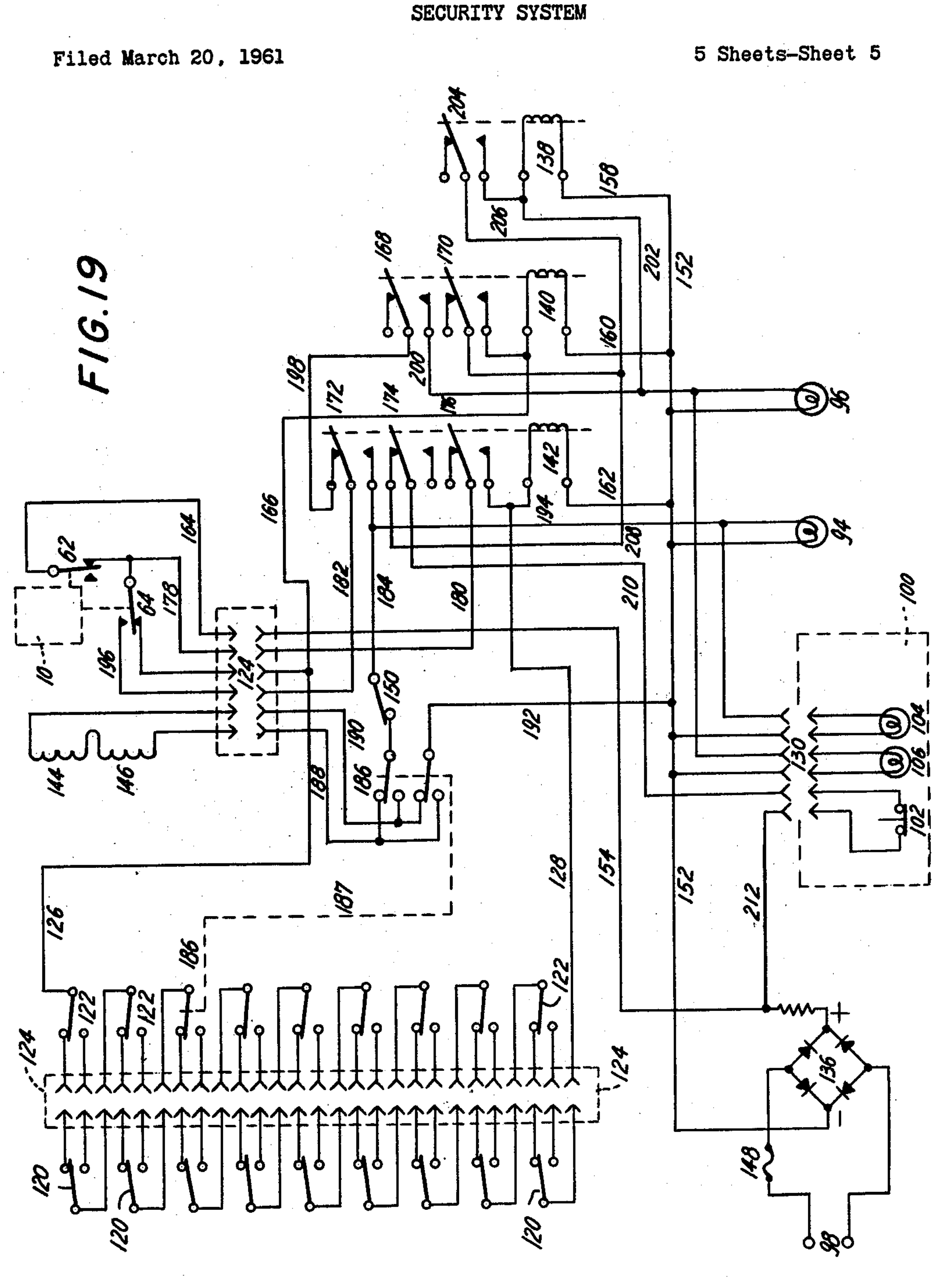
FIG. 19 is a wiring diagram for the detector and remote indicator.

Referring now to FIG. 19, the 110 v. A.C. supply comes in at 98, and is fused at 148. It is connected directly to the recitifier 136, the output of which is led to conductors 152 and 154. Conductor 152 is a common return, and is connected to the three relay coils by way of conductors 158 for relay 138; 160 for relay 140; and 162 for relay 142.

The switches shown in FIG. 11 are all single pole double throw switches, except that switch 186 is a triple pole double throw switch, one pole of which is used like the other switches generally marked 122. The other two poles of switch 186, and also switch 150, which is a single pole switch, are used in connection with the devalidating magnets 144, 146, as next described in connection with FIG. 19. In that figure the two parts of the switch 186 are shown connected by a dotted line 187 to indicate that all three poles of the switch are moved in unison.

As a pass is inserted switch 62 is closed to the right, switch 64 is closed to the bottom, and a circuit is established through the coil of relay 140. This circuit may be traced from the right side of the bridge 136 through conductor 154, connector 124, conductor 164, switch 62, switch 64, connector 124, conductor 166, relay coil 140, conductor 160, common return 152, and so back to the left or negative side of bridge 136. The energization of coil 140 moves the relay contacts 168 and 170 down. When the pass is inserted, the bottom switch energizes all relays, and the magnet strips in the pass either change the original circuit, or do not. Since there are only two directional positions, the current is directed in one way or the other. Because there are nine strips in the pass, the result is a geometric progression of two to the ninth power. If the sequence in the pass agrees with the predetermined sequence set up in the detector unit, there is no change. If it does not agree, the circuit is broken, and the two relays involved will not coincide. This results in a red signal.

The closing of switch 64 also supplies current through connector 124 and conductor 126 to the bank of switches 122 and pivoted contacts 120, these being connected in zig-zag series as previously described, so that if all of the pivoted contacts are in proper relation to all of the manually set switches 122, a circuit is completed all the way down to the bottom line 128, whereupon relay coil 142 is energized. This moves the relay contacts 172, 174 and 176 from upper to lower position, whereupon contact 176 supplies current through side switch 62, conductor 178, connector 124, conductor 180, contact 176, to the relay coil 142, and thence back to common return 152 so that the relay remains locked or closed in down position.

When relay contact 172 is closed downward it prepares a circuit, not yet alive, from line 182 to line 184, manual switch 150, the upper pole of switch 186, conductor 188, connector 124, devalidator coils 146, 144, connector 124, line 190, the lower pole of switch 186, and line 192, back to common return 152. Thus the coils 144, 146 are prepared to devalidate a pass after detection, but are not yet energized because the bottom switch 64 is still closed downward. However, immediately on raising of the pass, the bottom switch 64 closes to its upper contact, while side switch 62 remains closed to its right contact, so that the coils 144, 146 are energized and reverse the polarity of at least one strip in the pass. When the pass is raised still higher and leaves the side switch 62, the circuit is opened and the coils 144, 146 are deenergized.

The lamps 94, 96 are normally out. However, with a correct pass, as above described, a circuit through the green lamp 94 is established as follows. The relay contact 172, having been moved to the lower contact, prepares for lighting of the green lamp because the bottom contact is connected through conductor 194 to green lamp 94 and thence back to common return 152. When bottom switch 64 is down the circuit is open. When the pass rises from the bottom switch, the green lamp is lighted and remains lighted until the pass leaves the side switch 62, at which time it is extinguished, and neither lamp is lighted.

If the pass does not have the proper polarity pattern, the circuit between upper conductor 126 and lower conductor 128 is not completed through the zigzag series circuit previously described, and in consequence the relay coil 142 is not energized, and the relay contacts 172, 174, and 176 remain in their upper position. As the pass is raised, the bottom contact 64 closes to its upper contact and supplies current through conductor 196, connector 124, conductor 182, upper relay contact 172, line 198 and thence to contact 168 of relay 140, which has been energized because the pass was of proper physical dimension and properly inserted, through wrongly polarized. Current then continues through line 200 to the red lamp 96, thereby lighting the lamp (and of course sounding an audible alarm when an audible alarm is provided).

Current from line 200 also flows through line 202 to the coil of relay 138, thereby energizing the same back to common return 152. This closes its relay contact 204 to down position, thereby supplying current through line 206 and line 208 to contact 174, and thence through line 210 to connector 130, which leads to the remote control unit 100, and more specifically to its remote button switch 102. The circuit is then completed back through connector 130 and line 212 to the right side of bridge 136. The red lamp will remain lighted unless and until an authorized guard puts it out by depression of remote button switch 102. The remote unit 100 has red and green lamps 104 and 106 corresponding to the lamps 94 and 96 previously described. These are wired through connector 130, in parallel with the green and red lamps 94 and 96, as will be evident from inspection of the drawing. All lamps use line 152 for a common return.

As previously mentioned, as the pass is removed, the bottom switch 64 moves to its upper contact, thereby energizing devalidator coils 144 and 146, until the pass leaves the side switch 62, when they are deenergized. However, if manually operable switch 150 is opened, the devalidator coils 144, 146 will not be energized and the pass remains valid from day to day until there is an intentional voiding of all passes, for which purpose it is merely necessary to close the switch 150.

The operation of the system may be reviewed as follows. It is based on the magnetic detection of the polarity of magnetizable strips concealed in an apparently conventional identification pass card. The person bearing the pass is required to insert the card in the slot of a coding device or validator, when leaving the plant or restricted area. This releases the exit barrier and also induces a magnetic flux of a predetermined polarity in each of the magnetic strips within the pass card.

Upon re-entering the area, this pass card is inserted in a detector which senses the polarity pattern or code in the card, and if the pattern agrees with the code set in the detector, the entrance barrier is released and the person may enter. If the pattern does not agree with the code set in the detector, an alarm system alerts the guard to investigate the card holder.

The magnetic flux pattern encoded in the strips within the pass card is not affected by handling or rough treatment of the card, and is as permanent as the card itself. The pattern of polarity cannot be changed except by a strong magnetic field applied in a particular way and in particular locations. Moreover, it is difficult to change a card because all of the inserts or strips in the card have to be saturated with magnetic flux at the same time. Their close proximity to one another prevents one strip being magnetized at a time, because the flux density needed to reverse the magnetism in the strip is of great enough magnitude to influence the adjacent strips unless they also are under the influence of energized electromagnets all at the same time.

The strip material retains the polarity given it by the energizing magnets, and yet can be instantly reversed in polarity when the energizing magnets are reversed in polarity. The strip material is rolled to specifications because it is not available in open stock in sheet form and to the thinness required for an insert.

The material here used is made by Indiana Steel Company under the name "Cunifi". It is equivalent to Alnico II and is a malleable permanently magnetic material. For the present purpose it is especially rolled down to a thickness of only .015 inch. In that form the material is not available on the open market, which makes it additionally difficult for someone to fraudulently reproduce a pass card for use in the present system.

The detector is equipped with a devalidating system that changes the code in the pass card as it is removed from the detector. In this way the pass is voided and it is impossible for more than one person to be admitted with the same card.

The system does not eliminate guards, but it reduces the number required, and increases their efficiency. One guard can supervise several entrance aisles, and be sure that everyone entering has the proper pass card.

The rate of entering of employees is governed by the type of barrier, such as the turnstile, rather than by the detector, because the latter will accept a properly coded card the instant the card is at the bottom of the slot. The validator is equally as fast in encoding the pass card.

In lieu of a turnstile, a photo-electric eye may be used with the system to sound an alarm if a person entering does not put a properly coded card in the detector.

The security of the system is multiplied by the guards being able to put a combination in the validator for the day crew coming out, and putting that same combination in the detector the next morning for the limited time required for that same group to enter. In brief, the combination can be changed for each group or shift at each entrance coming and going. Also, if a lost card is found, or if one is "lifted" from an employee, the illegal card holder does not know which gate or aisle the card is good for, nor at what time or shift the card will be valid. Also, if he chances an entrance and comes in at the wrong time, or does not use the right detector, he will set off the alarm and be apprehended so that he cannot try again.

Where security measures are not as stringent, the system lends itself to a simple means of operation requiring little or no attention. The validator is placed in the guard headquarters and is used only at long intervals to set up new cards from time to time as required. The electromagnets 144 and 146 are eliminated from the detector, or switch 150 is changed so that they are not used, and the pass then is not voided each time it is used. After a period of time, or when it is noticed that a number of cards have been lost, all issued cards can be changed by having the outgoing personnel revalidate their cards. The validator is portable, and can be placed on a stand in the aisle, with a guard directing the operation.

The system is relatively inexpensive. It is simple to operate. Installation may be with or without a mechanical barrier, and the interruption of a light beam can be the means for detecting a person passing the detector. Power requirements are taken from an ordinary 110 volt A.C. standard receptacle. The alarm (visual or/and audible) may be in the detector box, or overhead in clear view of the guard, or both. In the event of a mechanical or electrical failure of either detector or validator, a reserve unit may be readily plugged in its place.

It is believed that the construction, operation, and method of use of my improved security system, as well as the advantages thereof, will be apparent from the foregoing detailed description. The pass may be normal looking pass, and may carry the usual information such as name, photograph, signature, fingerprint, or whatever else may be desired. In addition it contains small concealed strips adapted to be impressed magnetically with a normally permanently retained but reversible polarity code. The pass is presented to a detector which must be satisfied as to the polarity code, failing which appropriate alarm means are provided, in addition to which a barrier may be controlled. The polarity code is readily changed, and may change from time to time, or daily, or even from shift to shift. The pass is presented on exit to a validator which impresses it with a polarity code for entrance the next day. A plant having multiple gates may be provided with detectors and validators at each gate, and these may be set alike, or set differently, as desired. The polarity code may be changed in the pass each time it has been presented to the detector. The validator checks whether the pass has been validated, and if not, an appropriate alarm may be provided.

It will be understood that while I have shown separate paths and turnstiles for entrance and exit, it is possible to use a single path and a single turnstile, the latter being of a type which can turn or lock in either direction. It is released for movement in one direction by the detector, and it is released for movement in the other direction by the validator. In all cases the validator and detector are preferably kept far enough apart so that someone seeking to enter the plant cannot put his pass in the validator first and then in the detector. This would not help gain entrance when the validator is set differently from the detector, as when the next day's polarity code is to be different, but it would help gain entrance when the polarity code is changed at alonger intervals instead of daily. In any case the apparatus locations and the adjacent fences are such that only a person leaving the plant has access to the validator, while those outside the plant do not, and, conversely, someone using the detector is kept somewhat spaced from inside the plant, so that he cannot be handed a pass by someone remaining inside the plant.

It will be apparent that while I have shown and described the system in several preferred forms, changes may be made in the structures shown, without departing from the scope of the invention, as sought to be defined in the following claims.

I claim:

1. A security system for protecting an enclosure, said system comprising a pass card having an array of separate small elongated strips of magnetic material adapted to be magnetized, with the polarity of one being independent of that of another so that the card is given a normally retained but changeable polarity code, a validator to magnetize the strips independently of one another in desired polarity, said validator including an array of electromagnets each with a pole located adjacent one end of a corresponding magnetizable strip in the card, a source of D.C. current, and an array of switches, one for each electromagnet, said switches being so connected in the circuits of the electromagnets that the current flow in any electromagnet may be reversed independently of the others to control the polarity thereof.

2. A security system as defined in claim 1 in which the validator is provided with an indicator means to indicate whether or not a pass presented thereto has been properly inserted into the validator.

3. A security system for protecting an enclosure, said system comprising a pass card having an array of separate small elongated strips of magnetic material adapted to be magnetized with the polarity of one being independent of that of another so that the card is given a normally retained but changeable polarity code, a detector to check whether the pass has the proper polarity code, said detector including an array of pivoted magnets, each located adjacent a corresponding strip in the pass card and disposed transversely of the strip whereby the pivoted magnet tends to turn to one side or the other depending on the polarity of the strip, electrical circuitry including contacts closed in one direction or the other depending on the direction of turning of the pivoted magnets, and an array of double-throw switches, one for each pivoted magnet, said switches being connected in polarity reversing relationship with said contacts, whereby the polarity pattern which satisfies the detector may be adjusted as desired.

4. A security system as defined in claim 3 in which the detector is connected to suitable indicator means to differentiate between a proper and an improper pass.

5. A security system as defined in claim 3 in which the detector is provided with a polarity reversing means disposed in alignment with at least one of the strips in the card, and appropriate means to make the polarity reversing means operative only during withdrawal of the pass subsequent to presentation of the pass to the detector for inspection thereby.

6. A security system as defined in claim 3 in which the detector is provided with polarity reversing electromagnets disposed in alignment with some of the strips in the card, and appropriate means to make the polarity reversing electromagnets operative only during withdrawal of the pass subsequent to presentation of the pass to the detector for inspection thereby, said polarity reversing electromagnets being operative on those strips which are in alignment with and move past said electromagnets as the pass is withdrawn from the detector.

7. A security system as defined in claim 3 in which the detector is provided with polarity reversing electromagnets disposed in alignment with some of the strips in the card, and appropriate means to make the polarity reversing electromagnets operative only during withdrawal of the pass subsequent to presentation of the pass to the detector for inspection thereby, said polarity reversing electromagnets being operative on those strips which are in alignment with and move past said electromagnets as the pass is withdrawn from the detector, said detector including a switch to reverse the polarity of the polarity reversing electromagnets, and means so interconnecting said switch and one of the switches in the aforesaid array of switches as to set the polarity reversing switch opposite to the strip in the card, so that at least one strip has its polarity reversed in order to void the card.

8. A security system for protecting an enclosure, said system comprising a pass card having an array of separate small elongated strips of magnetic material adapted to be magnetized with the polarity of one being independent of that of another so that the card is given a normally retained but changeable polarity code, a validator to magnetize the strips independently of one another in desired polarity, and a detector to check whether the pass has the proper polarity code, said validator including an array of electromagnets each with a pole located adjacent one end of a corresponding magnetizable strip in the card, a source of D.C. current, an array of switches, one for each electromagnet, said switches being connected in polarity reversing relationship with said electromagnets, whereby the current flow in any electromagnet may be reversed independently of the others to control the polarity thereof, and said detector including an array of pivoted magnets, each located adjacent a corresponding strip in the pass card and disposed transversely of the strip whereby the pivoted magnet tends to turn to one side or the other depending on the polarity of the strip, electrical circuitry including contacts closed in one direction or the other depending on the direction of turning of the pivoted magnets, and an array of double-throw switches, one for each pivoted magnet, said switches being connected in polarity reversing relationship with said contacts, whereby the polarity pattern which satisfies the detector may be adjusted to conform to that of the validator.

9. A security system as defined in claim 8 in which the validator is provided with an indicator means to indicate whether or not a pass presented thereto has been properly inserted into the validator.

10. A security system as defined in claim 8 in which the detector is connected to suitable indicator means to differentiate between a proper and an improper pass.

11. A security system as defined in claim 8 in which the detector is provided with a polarity reversing means disposed in alignment with at least one of the strips in the card, and appropriate means to make the polarity reversing means operative only during withdrawal of the pass subsequent to presentation of the pass to the detector for inspection thereby.

12. A security system as defined in claim 8 in which the detector is provided with polarity reversing electromagnets disposed in alignment with some of the strips in the card, and appropriate means to make the polarity reversing electromagnets operative only during withdrawal of the pass subsequent to presentation of the pass to the detector for inspection thereby, said polarity reversing electromagnets being operative on those strips which are in alignment with and move past said electromagnets as the pass is withdrawn from the detector.

13. A security system as defined in claim 8 in which the detector is provided with polarity reversing electromagnets disposed in alignment with some of the strips in the card, and appropriate means to make the polarity reversing electromagnets operative only during withdrawal of the pass subsequent to presentation of the pass to the detector for inspection thereby, said polarity reversing electromagnets being operative on those strips which are in alignment with and move past said electromagnets as the pass is withdrawn from the detector, said detector including a switch to reverse the polarity of the polarity reversing electromagnets, and means so interconnecting said switch and one of the switches in the aforesaid array of switches as to set the polarity reversing switch opposite to the strip in the card, so that at least one strip has its polarity reversed in order to void the card.

14. A security system for protecting an enclosure, said system comprising a pass card having an array of separate small elongated strips of magnetic material adapted to be magnetized with the polarity of one being independent of that of another so that the card is given a normally retained but changeable polarity code, a validator to magnetize the strips independently of one another and concurrently in desired polarity, said validator including a first array of electromagnets each with a pole located on one side of the card adjacent one end of a corresponding strip in the card and a second array of electromagnets, each with a pole located on the other side of the card adjacent the other end of said corresponding strip in the card, means electrically connecting the companion first and second magnets for simultaneous energization in opposite polarity, a source of D.C. current, and an array of double-throw switches, one for each pair of electromagnets, whereby the current flow in any electromagnet pair may be reversed independently of the others to control the polarity thereof.

15. A security system for protecting an enclosure, said system comprising a pass card having an array of separate small elongated strips of magnetic material adapted to be magnetized with the polarity of one being independent of that of another so that the card is given a normally retained but changeable polarity code, a validator to magnetize the strips independently of one another and concurrently in desired polarity, and a detector to check whether the pass has the proper polarity code, said validator including a first array of electromagnets each with a pole located on one side of the card adjacent one end of a corresponding strip in the card and a second array of electromagnets each with a pole located on the other side of the card adjacent the other end of said corresponding strip in the card, means electrically connecting the companion first and second magnets for simultaneous energization in opposite polarity, a source of D.C. current, an array of double-throw switches, one for each pair of electromagnets, said switches being connected in polarity reversing relationship with said electromagnets, whereby the current flow in any electromagnet pair may be reversed independently of the others to control the polarity thereof, and said detector including an array of pivoted magnets, each located adjacent a corresponding strip in the pass card and disposed transversley of the strip whereby the pivoted magnet tends to turn to one side or the other depending on the polarity of the strip, electrical circuitry including contacts closed in one direction or the other depending on the direction of turning of the pivoted magnets, and an array of double-throw switches, one for each pivoted magnet, said switches being connected in polarity reversing relationship with said contacts, whereby a polarity pattern which satisfies the detector may be adjusted to conform to that of the validator.

16. A security system for protecting an enclosure, said system comprising a pass card having an array of separate small elongated strips of magnetic material adapted to be permanently magnetized with the polarity of one being independent of that of another so that the card is given a normally retained but changeable polarity code, and a validator to magnetize the strips independently of one another in desired polarity, said validator including an array of electromagnets each with a pole located adjacent one end of a corresponding strip in the card, a source of D.C. current, and switches and circuitry whereby the current flow in any electromagnet may be reversed independently of the others in order to control the relative polarity thereof.

17. A security system for protecting an enclosure, said system comprising a pass card having an array of separate small elongated strips of magnetic material adapted to be permanently magnetized with the polarity of one being independent of that of another so that the card is given a normally retained but changeable polarity code, and a detector to check whether the pass has the proper polarity code, said detector including an array of pivoted magnets each located adjacent a corresponding strip in the pass card and disposed transversely of the strip whereby the pivoted magnet tends to turn to one side or the other depending upon the polarity of the strip, electrical circuitry including contacts closed in one direction or the other depending on the direction of turning of the pivoted magnets, and additional switches and circuitry connected in polarity reversing relationship with said contacts whereby the polarity pattern which satisfies the detector may be adjusted as desired.

18. A security system for protecting an enclosure, said system comprising a pass card having an array of separate small elongated strips of magnetic material adapted to be permanently magnetized with the polarity of one being independent of that of another so that the card is given a normally retained but changeable polarity code, a validator to magnetize the strips independently of one another in desired polarity, and a detector to check whether the pass has the proper polarity code, said validator including an array of electromagnets, each with a pole located adjacent one end of a corresponding strip in the card, a source of D.C. current, and switches and circuitry whereby the current flow in any electromagnet may be reversed independently of the others in order to control the relative polarity thereof, and said detector including an array of pivoted magnets each located adjacent a corresponding strip in the pass card and disposed transversely of the strip whereby the pivoted magnet tends to turn to one side or the other depending upon the polarity of the strip, electrical circuitry including contacts closed in one direction or the other depending on the direction of turning of the pivoted magnets, and additional switches and circuitry connected in polarity reversing relationship with said contacts whereby the polarity pattern which satisfies the detector may be adjusted to conform to that of the validator.

19. A security system for protecting an enclosure, said system comprising a pass card having an array of separate small elongated strips of magnetic material adapted to be permanently magnetized with the polarity of one being independent of that of another so that the card is given a normally retained but changeable polarity code, and a validator to magnetize the strips independently of one another in desired polarity, said validator including a first array of electromagnets, each with a pole located on one side of the card adjacent one end of a corresponding strip in the card and a second array of electromagnets each with a pole located on the other side of the card adjacent the other end of said corresponding strip in the card, means electrically connecting the companion first and second magnets for simultaneous energization in opposite polarity, a source of D.C. current, and switches and circuitry whereby the current flow in any pair of electromagnets may be reversed independently of the others in order to control the relative polarity thereof.

20. A security system for protecting an enclosure, said system comprising a pass card having an array of separate small elongated strips of magnetic material adapted to be permanently magnetized with the polarity of one being independent of that of another so that the card is given a normally retained but changeable polarity code, a validator to magnetize the strips independently of one another in desired polarity, and a detector to check whether the pass has the proper polarity code, said validator including a first array of electromagnets, each with a pole located on one side of the card adjacent one end of a corresponding strip in the card and a second array of electromagnets each with a pole located on the other side of the card adjacent the other end of said corresponding strip in the card, means electrically connecting the companion first and second magnets for simultaneous energization in opposite polarity, a source of D.C. current, and switches and circuitry whereby the current flow in any pair of electromagnets may be reversed independently of the others in order to control the relative polarity thereof, and said detector including an array of pivoted magnets each located adjacent a corresponding strip in the pass card and disposed transversely of the strip whereby the pivoted magnet tends to turn to one side or the other depending upon the polarity of the strip, electrical circuitry including contacts closed in one direction or the other depending on the direction of turning of the pivoted magnets, and additional switches and circuitry whereby the polarity pattern which satisfies the detector may be adjusted to conform to that of the validator.

References Cited in the file of this patent

UNITED STATES PATENTS

| | | |
|---|---|---|
| 2,689,279 | Noregaard | Sept. 14, 1954 |
| 2,967,916 | Williams | Jan. 10, 1961 |
| 3,015,087 | O'Gorman | Dec. 26, 1961 |

FOREIGN PATENTS

| | | |
|---|---|---|
| 367,206 | Great Britain | Jan. 18, 1923 |